US007807003B2

(12) United States Patent
Schuler

(10) Patent No.: US 7,807,003 B2
(45) Date of Patent: Oct. 5, 2010

(54) METHOD AND DEVICE FOR FILLING INSULATING GLASS PANES WITH A GAS OTHER THAN AIR

(75) Inventor: Peter Schuler, Tiefenbronn (DE)

(73) Assignee: Bystronic Lenhardt GmbH, Neuhausen (DE)

( * ) Notice: Subject to any disclaimer, the term of this patent is extended or adjusted under 35 U.S.C. 154(b) by 985 days.

(21) Appl. No.: 11/521,139

(22) Filed: Sep. 13, 2006

(65) Prior Publication Data

US 2007/0068616 A1 Mar. 29, 2007

(30) Foreign Application Priority Data

Sep. 13, 2005 (DE) ....................... 10 2005 044 861

(51) Int. Cl.
*C03C 27/10* (2006.01)

(52) U.S. Cl. ...................................................... 156/109

(58) Field of Classification Search ................... 156/99, 156/102, 107, 109; 141/4, 65, 129, 163, 141/164, 165
See application file for complete search history.

(56) References Cited

U.S. PATENT DOCUMENTS 5,350,469 A 9/1994 Lenhardt et al.
5,626,712 A 5/1997 Lisec
5,645,678 A 7/1997 Lisec
5,676,782 A 10/1997 Lisec
2004/0182518 A1 9/2004 Lisec

FOREIGN PATENT DOCUMENTS

DE 20113608 U1 1/2002
EP 0615044 9/1994
EP 0674086 9/1995
EP 0674087 9/1995
EP 1450001 2/2003
WO PCT/EP91/01307 6/1991

*Primary Examiner*—Richard Crispino
*Assistant Examiner*—Christopher Schatz
(74) *Attorney, Agent, or Firm*—Orum & Roth LLC

(57) ABSTRACT

A method for assembling insulating glass panes from two or more glass sheets filled with a gas other than air, two plates facing each other, arranged parallel to each other vertically to inclined with adjustable mutual distance, a horizontal conveyor arranged near the lower edge of the plates, a first sealing device and a second sealing device, positioned at the protruding edges of both the plates or near these edges or between the plates and can extend between the horizontal conveyor and a point lying above the horizontal conveyor, and having means for feeding a gas other than air into a chamber, delimited on both the sides by the two plates and by the two sealing devices. For assembling overlong insulating glass panes, the glass sheets, at one of which a frame-like spacer is attached on both the sides, are positioned between the plates an the plates opposite each other.

6 Claims, 6 Drawing Sheets

METHOD AND DEVICE FOR FILLING INSULATING GLASS PANES WITH A GAS OTHER THAN AIR

Figure 1:
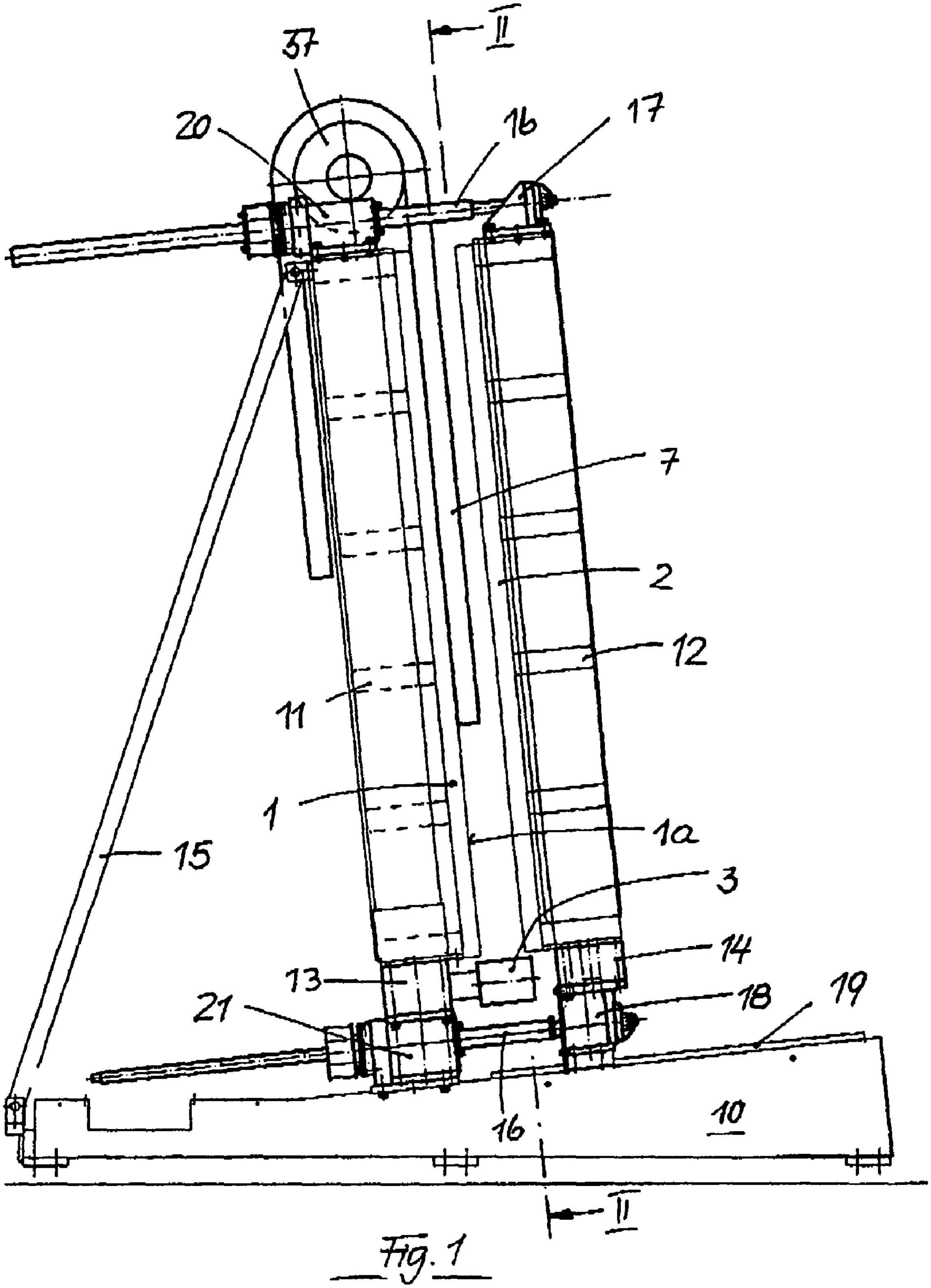

The invention assumes a method with the features specified in the preamble of claim 1. Such a method is known from the EP 0 539 407 B1.

The EP 0 539 407 B1 reveals a press, in which glass sheets are assembled and pressed to a specified thickness between a fixed pressing plate and a plate parallel to this, whose distance can be adjusted, to make insulation glass panes.

In the known press, both the pressing plates are not exactly vertical, but instead are inclined by a few degrees. In the press, two glass sheets, from which an insulation glass pane is to be made, are positioned lying opposite to each other. One of the glass sheets is equipped with a frame-like spacer and lies at the pressing plate inclined backward, while it stands on a horizontal conveyor. The other glass sheet is held opposite to this at the other, movable pressing plate, especially by the mechanism of sucking it to the movable pressing plate. When the movable pressing plate approaches the fixed one, this glass sheet gets stuck to the spacer holding the glass sheet lying opposite, as a result of which the insulation glass pane is closed.

Before the insulating glass pane is completely closed, it can be filled in the press with a heavy gas. For this purpose a section of the movable press plate, which lies backward at one of the protruding margins of the pressing plate, that is, away from the opposite pressing plate, can be bent. The sucked glass sheet is thereby also bent backward. If the movable pressing plate is now brought near the fixed pressing plate in this state, then the insulating glass pane is closed except in the area, in which one of the glass sheets is bent backward. In the almost completely closed insulating glass pane, heavy gas can be introduced through the gap between the bent glass sheet and the spacer, which displaces air from the insulating glass pane. Thereafter the insulating glass pane is closed completely by cancelling the bend in the pressing plate and in the glass sheet attached to it.

Presses, in which the insulating glass panes can be assembled and filled with gas, frequently have a length of 3.5 m. However, it is possible that the insulating glass panes are longer than the pressing plates. Insulating glass panes with a length of up to 5 m are frequent. They can be assembled and filled with gas in the presses known from the EP 0 539 407 B1. To do this, one positions the glass sheets in the press in such a way that they close flush with that margin of the movable press plate, at which the section bent backward is provided. At the opposite end of the press plates the glass sheets then protrude beyond this. Too long glass sheets can, therefore, be assembled and filled with gas in the known press, because when the movable press plate approaches the fixed press plate, even the protruding section of the insulating glass pane is closed and the heavy gas can be filled, as usual, at the opposite bent end.

In case of especially long insulating glass panes, however, it is difficult to displace the air from the far-reaching areas at the other end of the insulating glass pane with the heavy gas, which is introduced at the bent end of the insulating glass pane. Presses, in which the insulating glass pane is filled with heavy gas at the lower end, avoid this disadvantage. For instance, such a press is known from the EP 0 674 086 B1 and from the EP 0 674 087 B1. In it, the glass sheets being assembled to make insulating glass panes can also be placed parallel and unconnected to each other. The heavy gas is introduced via the openings in a conveyor belt, on which the glass sheets are present, as long as the glass sheets are still completely unconnected. To ensure that the heavy gas does not flow out of the area between the glass sheets, adjustable sealing elements, running, from bottom to top, are provided, which become effective at the protruding ends of the glass sheets. In the area thus formed between the glass sheets and the sealing elements, the heavy gas now rises from bottom to top and displaces the lighter air to the top.

Alternatively, the glass sheets, of which one is carrying a spacer, can also be arranged in such a way in the presses known from the EP 0 674 086 B1 and the EP 0 674 087 B1, that the other glass sheet with its upper margin also lies against the spacer, so that the glass sheets diverge away from each other in a wedge-shaped manner from top to bottom. Even in this case, the area between the glass sheets is filled with heavy gas from below, which displaces the air above through a free area between the sealing elements and the protruding margins of the glass sheets or between the sealing element and the protruding side piece of the spacer.

If the heavy gas has risen till the upper margin of the glass sheets, the movable press plate is brought closer to the stationary press plate and thereby the insulating glass pane is closed and pressed.

In such a press excessively long insulating glass panes can be assembled, but cannot be filled with a heavy gas, because the section of the still unconnected glass sheets, protruding out of the press, would still be open, from which the heavy gas would flow out unrestricted.

It is the object of the present invention to show a way, how in a press with two parallel, vertical or inclined pressing plates, which is designed for filling the area between the glass sheets with a heavy gas from below, excessively long insulating glass panes can be filled with a heavy gas.

This object is accomplished by a method with the features specified in claim 1. Advantageous developments of the invention are the subject of the subclaims.

According to the invention, it is intended to seal the section of the glass sheets protruding out of the area between the plates making up the press in such a way that one already connects both the glass sheets in this section by means of a frame-like spacer, for which one bends the glass sheet, which at first does not have the spacer, out of its plane towards the other glass sheet and, if needed, brings it closer through parallel displacement to such an extent that the sections of the glass sheets protruding from the area between the plates get firmly stuck to each other, whereas in the space between the plates the glass sheet, which initially is free from the spacer, still maintains a distance to the spacer, which can be 2 mm to 3 mm. This distance is ensured by the fact that the bent glass sheet is held firmly at that plate further inside in the space between both the plates, against which it is lying with its rear side, especially by the fact that it—as already known—is sucked to the plate through the openings present in the plate.

In this position now, heavy gas can be filled in the space between the glass sheets from below. Flowing out of the heavy gases from below is prevented by a horizontal conveyor, which, for this purpose, is best designed as rope-belt conveyor. At the margin of the plates, at which the glass sheets are still unconnected, the chamber to be filled with heavy gas is sealed with the first sealing device. At the opposite ends of the plates, already closed sections of the insulating glass pane are present. If the insulating glass pane is rectangular, it can be filled with the heavy gas from below till its upper margin, without that a protruding sealing device would be necessary at this end of the plates. In case of insulating glass panes, which have a rectangular outline, the so-called model plates, however, in most of the cases a supplementary sealing through a second sealing device is necessary, in which case it is preferably a sealing element that can be moved from top to bottom, which becomes effective near the upwardly extending margin of the plates, where the protruding sections of the glass sheets are positioned. The second sealing device is moved down till the upper margin of the glass sheet arrangement, better, till the upper side of the spacer, in order to prevent that the rising heavy gas flows sideways. Another sealing device is recommended at a location below the second sealing device, in order to close the gap between the horizontal conveyor and the insulating glass pane, through which otherwise—despite closing the section protruding beyond the plates—a part of the heavy gas could flow out.

The device according to the invention has the first sealing device upwardly extending from the horizontal conveyor in the area of a protruding margin of the plates and a second sealing device in the area of the opposite margin of the plates, which can preferably be displaced from top to bottom. It can be arranged between the plates and in this state can be introduced in the space between the plates from top to bottom along the surface of the plates facing each other and can be compressed reversibly by reducing the mutual distance of the plates. However, it can also be arranged outside the plates near their margins, where it can purposefully be displaced in the guides.

Such a second sealing device has distinct advantages, when long glass sheets are to be processed:

Already during the positioning of the glass sheets, from which the insulating glass pane is to be assembled, the second sealing device can be lowered with its lower end to a height just above the upper margin of the upper glass sheet. This is advantageous for a shorter cycle time of the device.

After positioning the glass sheets between the plates of the device, the second sealing device only needs to be lowered on the upper edge of the glass sheets. This is done within a second, because very little mass is needed for the second sealing device, so that it has only very little inertia and can be accelerated or decelerated very quickly.

In case of rectangular insulating glass panes, the second sealing device can even remain in an ineffective position, because the heavy gas needs not to rise above of the upper edge of the insulating glass pane.

The second sealing device is preferably designed in such a way that it can be bent against a restoring force from a straight shape which it assumes, in the relaxed state, and can be reset again in the straight shape by the restoring force. This means that the second sealing device, when it is pushed down from the top, assumes and retains a straight shape on its own. This further means that the sealing device, if one lets it hang freely from the top or else move it down over a plate inclined backward, strives for a straight shape and also normally achieves it. This helps in creating well-defined relationships between the plates. Such a second sealing device is suitable to be lowered in the gap between both the plates till the horizontal conveyor, hanging freely and still linear and free of obstructions without any special guide. Another advantage is that the second sealing device can be deflected above the plates and can be lowered along the outer side of the plate, preferably under loop formation, or else can also be wound in a space-saving way.

There are different design options for the second sealing device. One possibility is to use a spring strip being V-shaped or a Z-shaped in the cross-section, which attaches itself to any of the two plates with a side piece, gets compressed when the mutual distance between the plates is reduced and thereby brings about a sealing from the level of the horizontal conveyor till the upper margin of the plates. Such V- and Z-shaped spring strips can be bent and wound easily.

In a first embodiment the second sealing device has a strand that can be compressed reversibly, which is connected with a flat spring strips on one side, which contacts flatly the one or the other plate, whereby the reversibly compressible strand gets compressed when the distance between the plates is reduced and thus brings about a sealing.

In another embodiment of the invention the second sealing device shows a reversibly compressible strand, which is connected to a spring strip on each of its opposite sides, which lie flatly against both the plates when the distance between them is reduced and thus bring about a sealing.

In another embodiment the second sealing device shows a reversibly compressible strand, in which at least one spring strip is embedded, especially centrally. This favors a deflection and a bending of the sealing device.

In another embodiment of the invention the second sealing device shows a steel tape, which is connected to a reversibly compressible strand on both of its sides, which omits edge stripes of the spring strip. Even in this embodiment the sealing device can be bent easily. Another advantage is that the spring strip can be guided at its edge stripes.

The reversibly compressible strand comprises preferably of foam plastic or of foam rubber. Such a design is economical, seals effectively, is reliable and has a long life.

Another possibility of forming a reversibly compressible strand is to make it from an elastomer hollow profile, e.g. from a profile rectangular in its cross-section. Such profiles can be produced economically by extrusion and are available in the market. They also have the advantage that they can also be wound easily, even in conjunction with a spring strip. The compression of the hollow profile can be simplified by predetermined fold lines that run longitudinally, which are provided in the walls of the hollow profile running transverse to both the plates of the device. Such predetermined fold lines simplify a controlled compression of the hollow profile, especially when the walls, in which the predetermined fold lines are provided, are folded slightly inward from the beginning itself.

Spring strips protruding beyond the reversibly compressible strand on both the sides simplify the guiding of the second sealing device. At the lower end, the reversibly compressible strand is preferably protrudes over the spring strips, so that the second sealing device can be placed on the margin of the glass sheets tightly and also in a saving manner or—in case of shorter glass sheets—hit the horizontal conveyor. The horizontal conveyor preferably shows an endless, driven conveyor belt, which not only conveys and carries the glass sheets in the device, but also seals on the lower side the chamber, in which the gas is introduced. Such a conveyor belt has been revealed, for instance, in the EP 1 450 001 A1. It can not only attach itself to the lower ends of the glass sheets, but can also be applied to the lower edges of both the plates.

To store the second sealing device in its ineffective position, so as to save space, a deflection device is provided at the upper edge of one of the plates, with the aid of which the second sealing device is deflected in a different direction from the vertical or from an almost vertical direction, when it is pulled out of the space between both the plates. In the simplest case, the deflection device is a roller, which has an axis of rotation parallel to the direction of conveying. One can let the second section of the sealing device pulled out of the space between the plates hang freely on the outside of the concerned plate. However, it is preferred to provide a special storage device for the section of the second sealing device taken out, especially a shaft running from top to bottom, in which the second sealing device is introduced, or a guiding profile running from top to bottom, which partly encompasses the second sealing device. One can also push the second sealing device in such a guiding profile, so that it has a defined position and does not collide anywhere. A shaft and such a guide profile can also be used combined with each other.

Another possibility is to fix the upper end of the second sealing device in the height of the deflection roller, but at a little distance from it, and to let it hang in loop-shape between the deflection roller at the location, at which the sealing device is fixed.

In another development of the invention a coiling device is intended for storage. It can also be used instead of the deflection roller mentioned above.

Pairs of drive gears, drive rollers or drive belts are suitable for driving the second sealing device, which act on the opposite sides of the second sealing device, especially at the protruding edge stripes of a spring strip, which is connected preferably—as already described above—with a reversibly compressible strand especially through adhesion or through vulcanization.

The pairs of drive gears, drive rollers or drive belts are purposefully arranged at or near the deflection device or the storage device. Here, guiding devices are also placed preferably, which also help in determining the bend, by which the second sealing device is deflected.

In a device for assembling the insulating glass panes, one of the two plates is mostly fixed. It requires the least effort to place the second sealing device and its deflection device at the fixed plate.

There are devices for assembling the insulating glass panes, in which both the opposite plates can be deviated from a position, in which they lie opposite to each other in a V-position, to a position, in which both of them are vertical and lie parallel to each other. Such a device has been disclosed in the EP 0 615 044 A1. However, in most of the devices for assembling the insulating glass panes, the two plates are parallel and not exactly vertical, but instead arranged at an inclination of about 6°, so that the glass sheets can be conveyed while they are leaning on a plate inclined backward. In such a device, the second sealing device is placed preferably at the plate inclined backward; this is the plate, whose inner side points inclined upwardly. The inner side of a plate here is the side, which is facing the plate lying opposite to it. Accordingly, the outer side of the plate is the side, which is facing away from the plate lying opposite to it.

If the second sealing device is arranged on the plate, whose inner side points inclined upward, then the advantage is that it is supported and guided easily by this plate. But it is also possible to arrange the second sealing device at the plate, whose inner side points downward.

Figure 2:
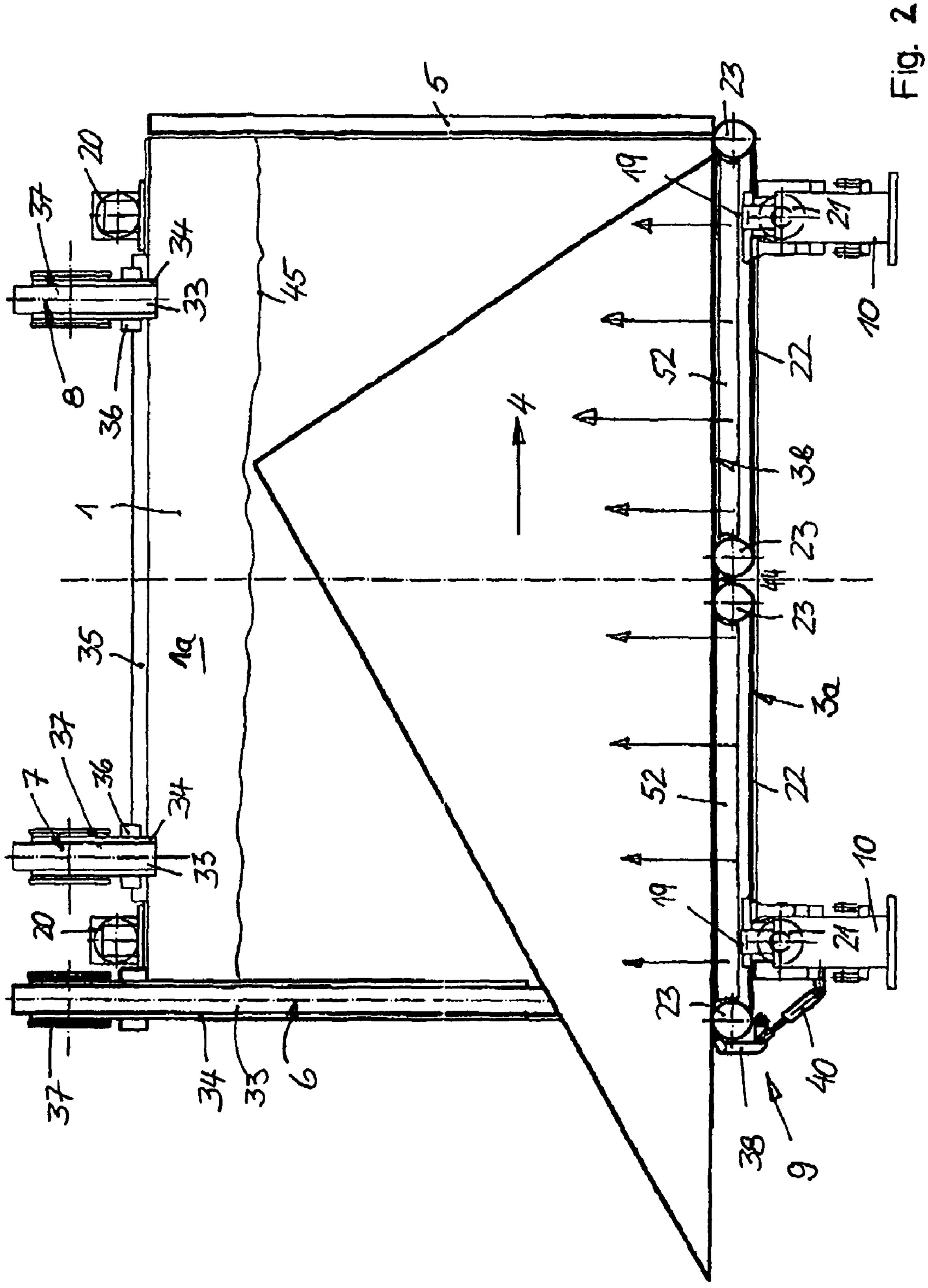
Figure 3:
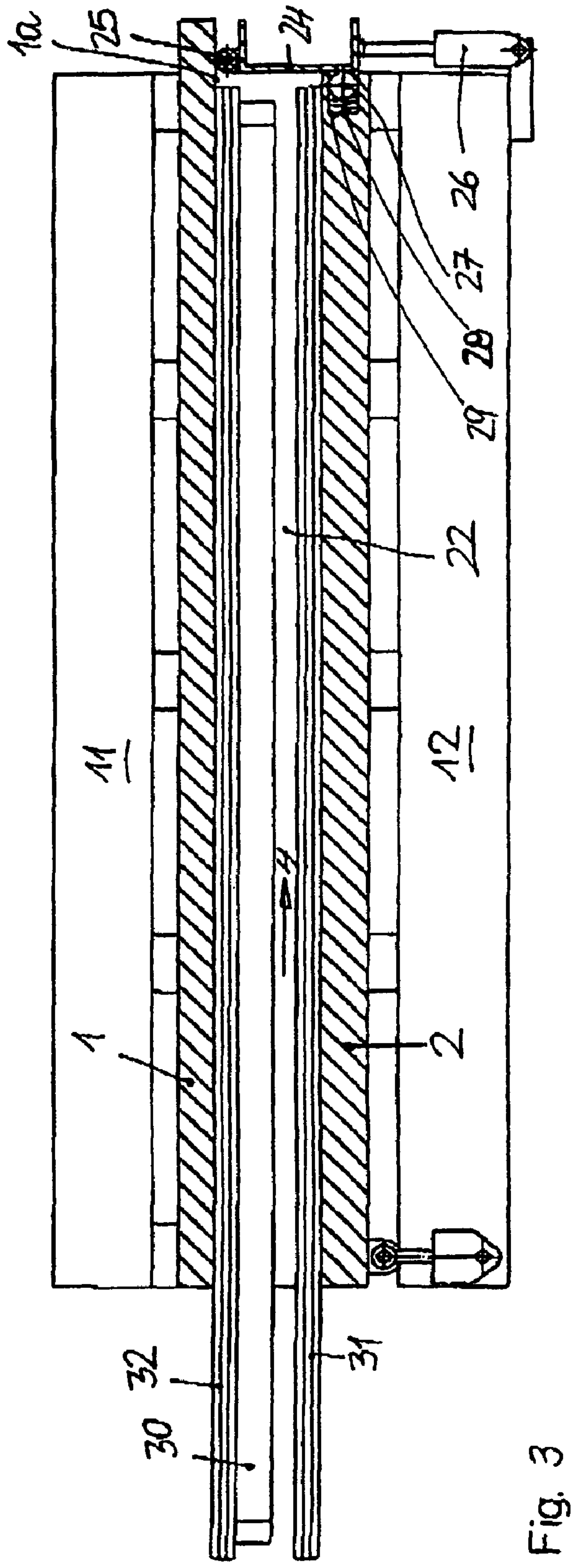
Figure 4:
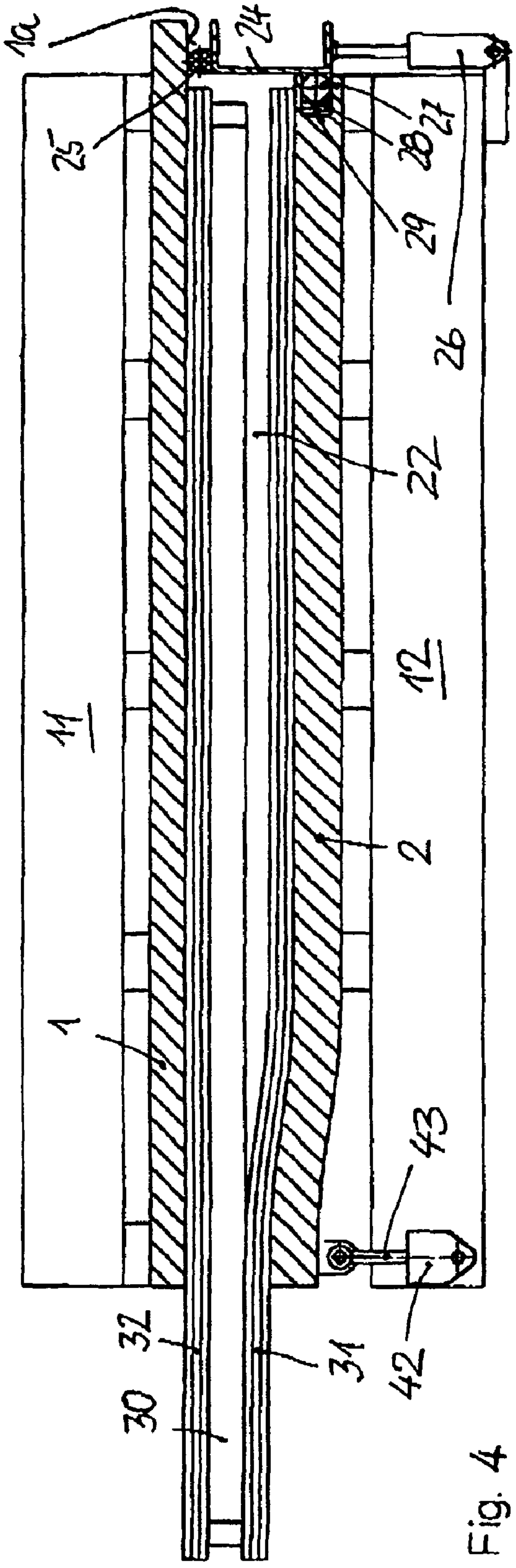
Figure 5:
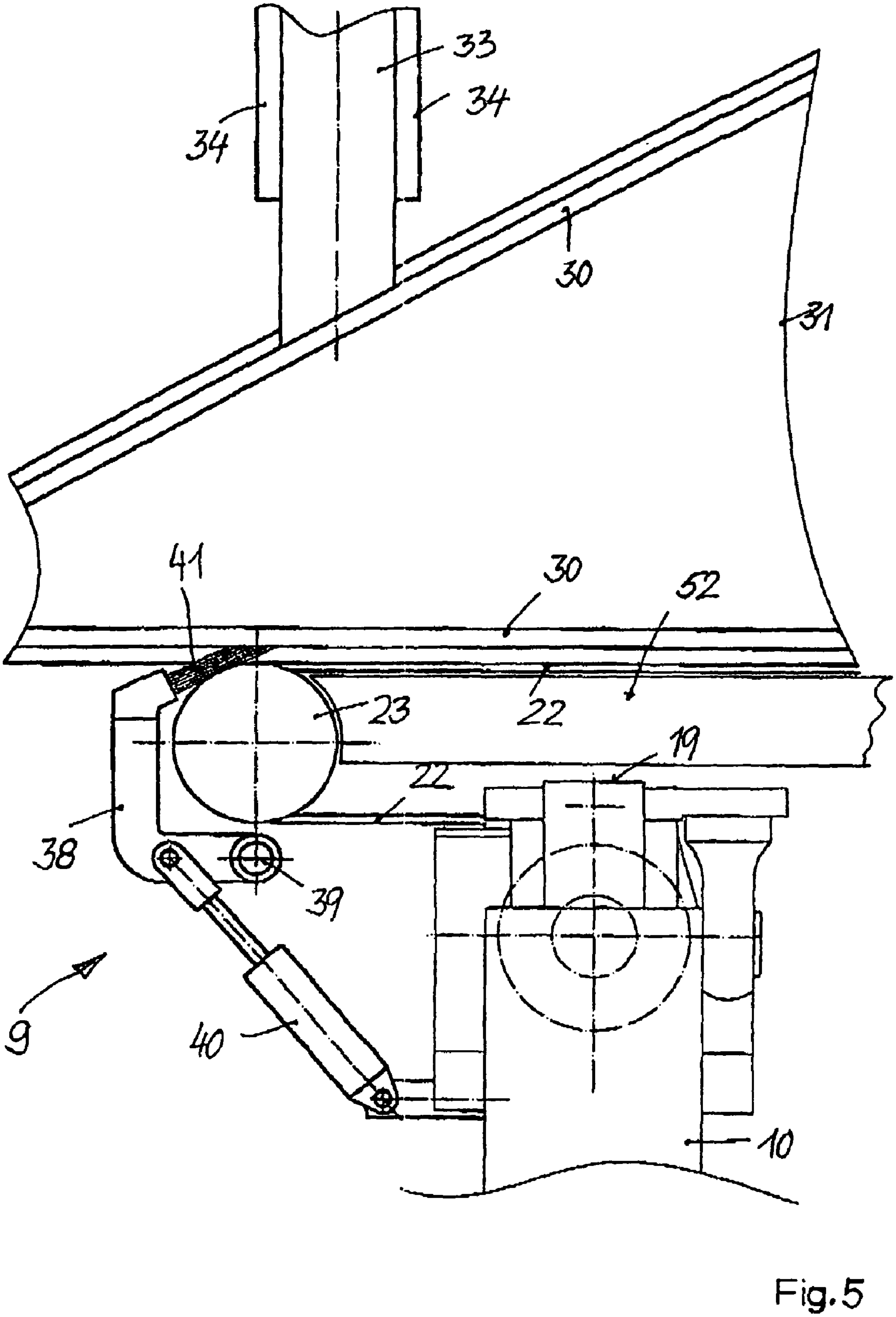
Figure 6:
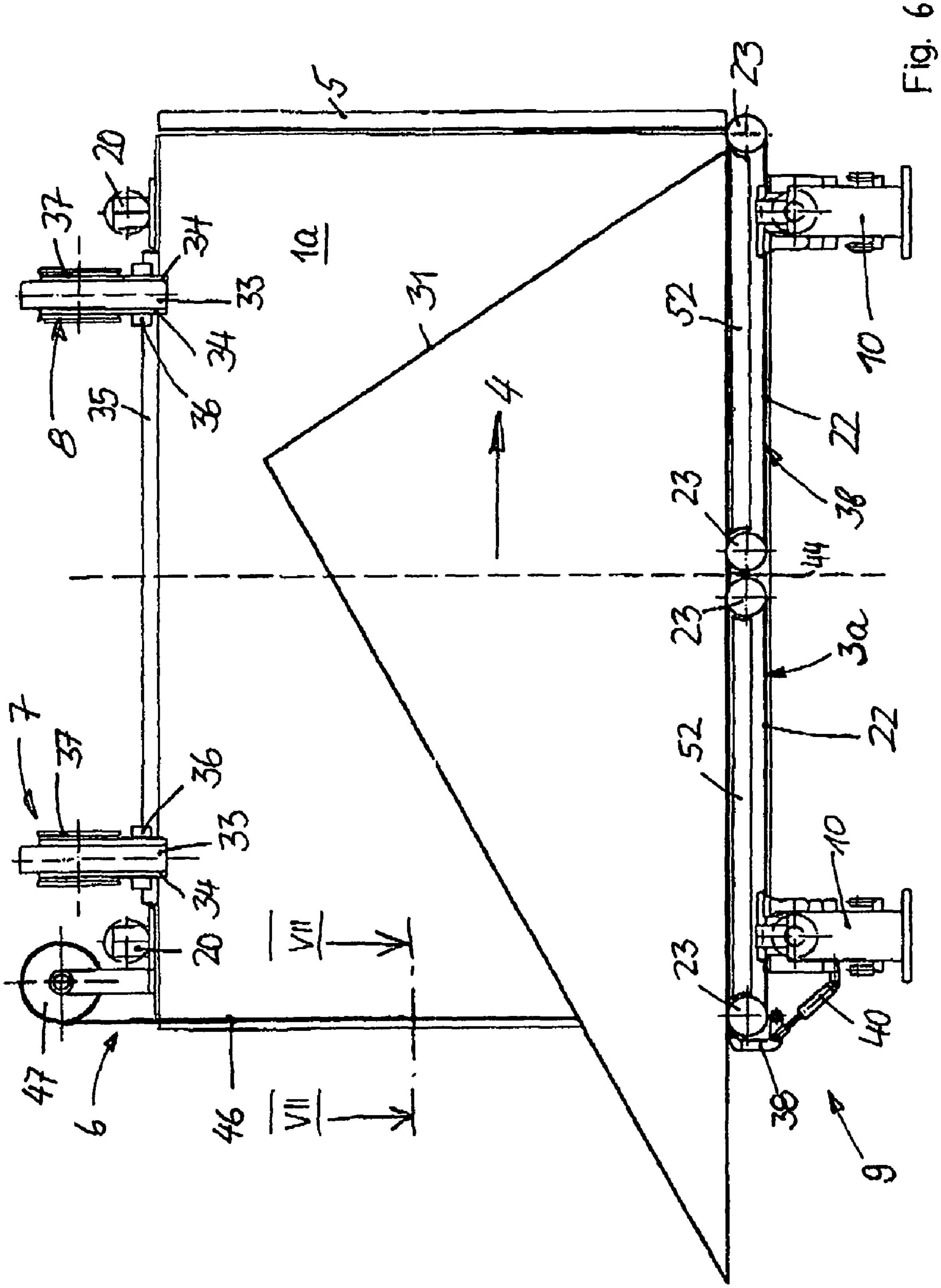
Figure 7:
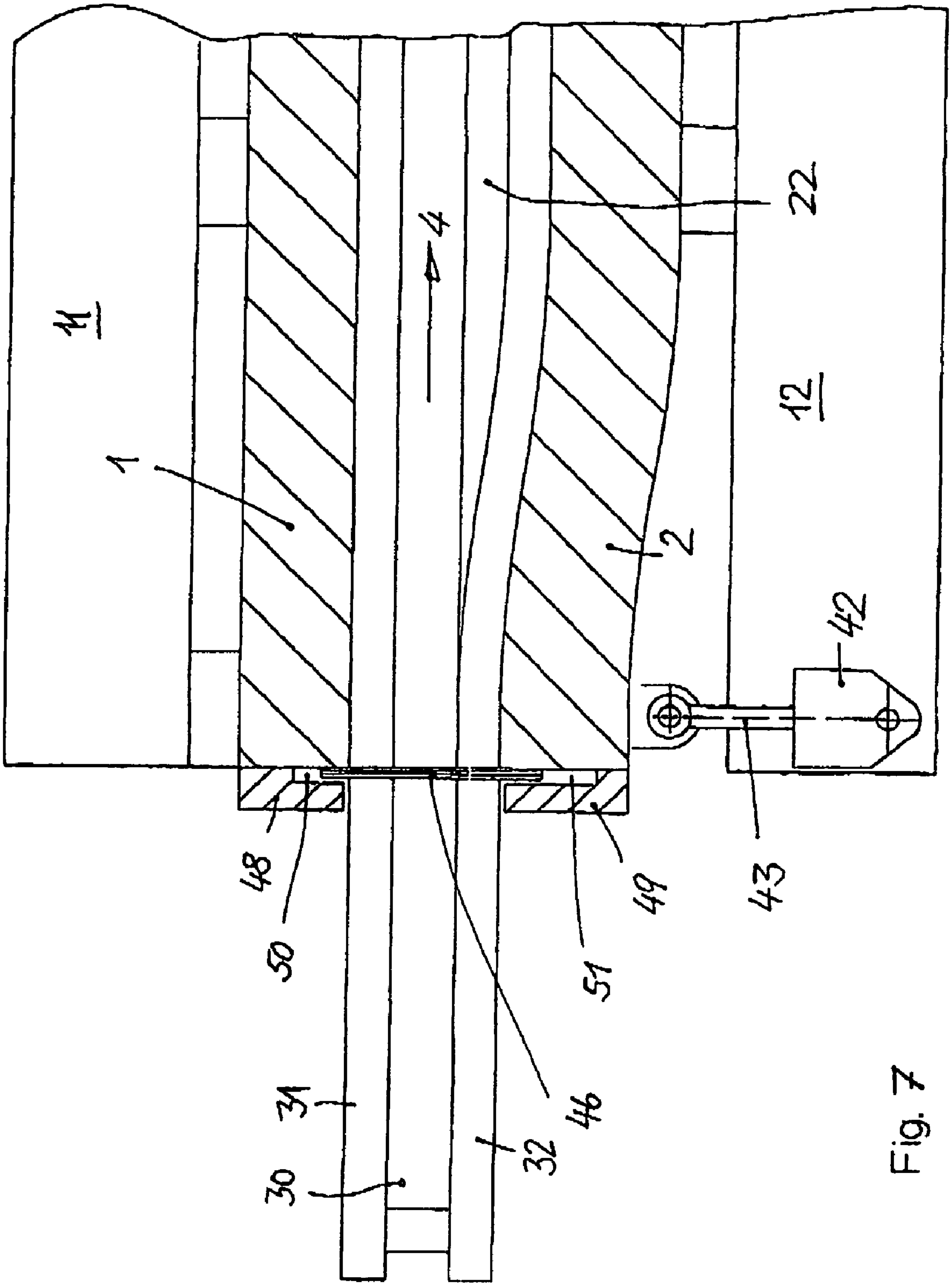

FIG. 1 shows a device according to the invention for assembling the insulating glass panes and for filling the insulating glass panes with a gas other than air in a side view with the direction of view parallel to the conveying direction of the horizontal conveyor of the device, FIG. 2 shows a section of the device parallel to both the plates of the device according to the section line II-II in FIG. 1 with a pair of glass sheets arranged in the space between the plates, FIG. 3 shows a horizontal section along the line III-III in FIG. 2 through the device in a position of the plates, in which both the glass sheets are still completely unconnected, FIG. 4 shows in a display as in FIG. 3 the position of the plates after closing the section of the insulating glass pane protruding above the device, FIG. 5 shows as a detail in a view corresponding to FIG. 2 the sealing of the section of the insulating glass pane protruding from the device, FIG. 6 shows a modification of the device in a view as in FIG. 2, and FIG. 7 shows the section VII-VII according to FIG. 6.

The same or the corresponding parts are identified in the embodiments with the same reference numbers.

FIGS. 1 to 5 show a device for assembling insulating glass panes with a stand 10, on which the first flat plate 1 is arranged fixed, and in a position inclined backward by a few degrees e.g. by 6°. The first plate 1 is held and strengthened on the back side by a framework type frame 11, which stands on a horizontally extending beam 13, which supports itself directly on the stand 10. On the back side, the frame 11 is also supported by struts 15 at the stand 10.

The first plate 1 lies parallel to and approximately coincides with a second plate 2 on the opposite side, which is held and strengthened on its outer side by a framework-like frame 12, at whose lower end a horizontally extending beam 14 is placed, which supports itself directly on the stand 10. Both the beams 13 and 14 are parallel to each other. The frame 12 of the second plate 2 is connected with the frame 11 of the first plate 1 by means of four spindles 16. The spindles 16 extend at a right-angle to the plates 1 and 2 and can be rotated in bearing blocks 17, which are fixed on the upper edge of the frame 12, and in bearing blocks 18, which are fixed at the lower side of the beam 14; however, they cannot be pushed in the bearing blocks 17 and 18. The lower bearing blocks 18 are placed sliding on rails 19, which are placed at a right-angle to the plates 1 and 2 on the stand 10.

At the upper edge of the frame 11 of the first plate 1, two casings 20 are provided opposite to the bearing blocks 17 and at the lower edge of the beam 13 two casings 21 are provided, which lie opposite to the bearing blocks 18 and are connected on one hand with the beam 13 and on the other with the stand 10. The casings 20 and 21 contain spindle nuts not shown here, which can be driven synchronously, as a result of which the second plate 2 can be displaced parallel to itself and its distance to the first plate 1 can be changed.

At the beam 13 below the first plate 1 a horizontal conveyor 3 is arranged parallel to the beam 13, which is divided in two consecutive sections 3*a*, 3*b*, see FIG. 2. In each section 3*a*, 3*b* there is an endless conveyor belt 22, which is spanned over two rollers 23, whose axes of rotation run at a right-angle to the plates 1 and 2 and of which one roller is driven. Both the conveyor belts 22 can selectively be driven individually or synchronously. Its carrying side is supported by a supporting beam 52.

At both vertical edges of one of the two plates 1 and 2 a first sealing device 5 and a second sealing device 6 are arranged. In the given embodiment, they are placed at the frame 12 of the second, movable plate 2. The first sealing device 5 consists of a strip 24 which is U-shaped in the cross-section and has an elastomer sealing cord 25 at its side piece facing the fixed plate 1 and at its other side piece is connected with at least two pneumatic piston-cylinder units 26, which are mounted on the frame 12. The strip 24 extends from the carrying side of the conveyor belt 22 till the upper edge of the plates 1 and 2. In its effective position, it applies with its sealing cord 25 to the inner side 1*a* of the first plate 1, which, for this purpose, protrudes by a small length over the upright margins of the second plate 2, as shown in the FIGS. 3 and 4. The base of the strip 24, which connects the two parallel side pieces of the strip 24 with each other, is attached to a sealing rod 27, which is arranged in a groove 29 of the protruding edges of the plate 2 and is loaded by means of springs 28. From the effective position shown in the FIGS. 3 and 4, the strip 24 can be pulled back in an ineffective position by means of a piston-cylinder unit 26, in which it clears the way for conveying the individual glass sheets 31, 32 into the space between the plates 1 and 2 or to convey out an assembled insulating glass pane from the space between the plates 1 and 2.

At the upper edge of the frame 11 of the fixed plate 1, a third sealing device 7 and a fourth sealing device 8 are placed. The second, third and fourth sealing devices 6, 7, 8 are a flexible, reversibly compressible strand 33 with a rectangular cross-section, which is covered with a spring strip 34 on one side, which protrudes over the strand 33 on both the sides. The strand 33 can be made of foam rubber or foam plastic. Alternatively the strand 33 can also be a hollow profile of an elastomer e.g. a box profile. The spring strip 34 is preferably a thin spring sheet made from spring steel having a thickness of 0.2 mm to 0.3 mm, to which the strand 33 is stuck or vulcanized. The spring strip 34 should not develop any restoring force when in a straight position, so that it aligns the second, third and the fourth sealing devices 6, 7, 8 in a straight shape, when these are hanged.

At the upper edge of the fixed plate 1 and its frame 11, a rail 35, extending between the casings 20 and parallel to the conveying direction 4 is placed, on which the third and the fourth sealing devices 7 and 8 as well as two carriers 36 can be moved, of which each carries a roller as a deflection device 37 and a driving device for the respective sealing device 7, 8. The driving device is described in more detail in the German Patent Application 10 2005 033 040.1.

FIG. 2 shows the third and the fourth sealing devices 7, 8 in their ineffective end position, in which they are essentially present outside of the space between the two plates 1 and 2.

The second sealing device 6 essentially has the same structure as the third and the fourth device 7, 8, but contrary to these cannot be moved parallel to the conveying direction 4, but instead is placed stationary at the left margin of the first plate 1.

FIG. 3 shows the first glass sheet 31 attached to the second plate 2 and the second glass sheet 32, to which a frame-like spacer is attached, which is coated on both sides with an adhesive, leaning against the first plate 1. Further, FIG. 2 shows the second sealing device 6 in its effective position, in which it is pushed down to the arrangement formed from the glass sheets 31, 32 and the spacer 30. In case of glass sheets, which are not so long that they protrude out of the space between the plates 1 and 2, it can be pushed down till the carrying side of the conveyor belt 22.

At the inlet side of the device there is provided at the stand 10 a fifth sealing device 9, which is shown in detail in FIG. 5. This is an angled lever 38, which can be swiveled by an axis 39 running at a right-angle to the plane of the plates 1 and 2. The axis 39 is fixed relative to the stand 10. For swiveling there is provided a pneumatic cylinder 40, which is provided with its end at the stand 10 and with its piston rod at the lever 38. At the free end of the lever 38 is placed a sealing element 41, which can be formed from an elastomer plate, from a strip of a soft foam material or from a brush with densely packed bristles. The arrangement is made in such a way that the sealing element 41 in its effective position, shown in FIG. 5, intervenes in the gap between the carrying side of the horizontal conveyor 3 and the lower edge of the arrangement of the glass sheets 31 and 32 and the spacer 30, especially also in the space between both the glass sheets 31 and 32 and lies on the spacer 30 present between the glass sheets 31 and 32. By activating the pneumatic cylinder 40 the sealing element 41 is swiveled in its effective position shown in FIG. 5 or is swiveled down from this effective position in an ineffective position.

Given below is a description of how one should proceed according to the invention, when the device shown in the FIGS. 1 to 5 is to assemble an insulating glass pane and is to be filled with a heavy gas, which shows an over-length, so that it protrudes beyond the press formed with the two plates 1 and 2.

Initially, all the sealing elements 5 to 9 are present in their ineffective position. The first glass sheet 31, standing on the conveyor belt 22 and leaning against the first plate 1 is conveyed in the direction 4 into the space between both the plates 1 and 2. In order that the first glass sheet 31 slides smoothly over the inner side 1*a* of the first plate 1, it is provided with numerous small openings, not shown here, through which air can be blown by means of a blower, which generates an air cushion between the glass sheet 31 and the inner side 1*a* of the plate 1. The first glass sheet 31 is conveyed till a given end position near the edge of the plate 2 lying in the front in the conveying direction 4. If the first glass sheet 31 has reached there, the horizontal conveyor 3 is stopped. The second plate 2, in which sucking devices, not shown here, are integrated, is moved against the first glass sheet 31 by activating the spindles 16, sucks it and is then removed again from the first plate 1. After this a second glass sheet 32, to which a frame-shaped spacer 30 is sticking, is moved in a position standing on the horizontal conveyor 3, in which it lies coinciding opposite to the first glass sheet 31. A rear section of the glass sheets 31, 32 protrudes out of the press formed by the plates 1 and 2.

If both the glass sheets 31, 32 are positioned opposite to each other in a coinciding way, the second sealing device 6 is pushed down from the top, till it meets the upper edge of the glass sheets 31 and 32 and preferably also till the upper side of the spacer. The strand 33 made of soft, compressible foam rubber protrudes over the front end of the spring strip 34. This enables the strand 33 to penetrate in the space between both the glass sheets 31, 32 till the spacer 30 and to apply to this, which can be supported by an inclined cut end, as shown in FIG. 5. Thereafter, the second plate 2 is brought closer to the first plate 1, until there is merely gap of a given width of e. g. 2 mm to 3 mm between the first glass sheet 31 and the spacer 30 lying opposite to it. In doing so the strand 33 of the second sealing device 6 is compressed and restricts the chamber to be formed for introducing the heavy gas above the spacer 30 between the glass sheets 31 and 32 and above the edge of the glass sheets 31 and 32 between both the plates 1 and 2. In this position of the plates 1 and 2, the first sealing device 5, adjacent to the front edge of the glass sheets 31 and 32 is activated and its strip is pushed forward, till it meets the fixed plate 1 with its sealing cord 25. FIG. 3 shows this state.

In the next step, several pressurizing cylinders 42 are activated, which are placed on the inlet side of the device one upon the other on the frame 12, which supports the second plate 2. The pressurizing cylinders 42 have a piston rod 43, which is hinged at the rear side of the second plate 2. By activating the pressurizing cylinders 42, the second plate 2 can be slightly moved forward at its inlet-side margin, e. g. by 2 mm to 3 mm, by bending the plate 2, as shown exaggerated in FIG. 4. In case the plate 2 is so stiff, that it would be difficult to bend it, it can also be divided in two sections, which can be connected by a hinge, whereby the axis of the hinge lies near to the inner side of the plate 2; in this case, the one small segment e.g. the segment arranged on the inner side, could be swiveled a little vis-à-vis the second, fixed segment, in order to bend the protruding section of the first glass sheet 31 against the spacer 30.

By pushing forward the inlet-side edge of the movable plate 2, the first glass sheet 31, which is adhering to the second plate 2, also gets bent, so that its section protruding out of the space between both the plates 1 and 2 gets connected to the similarly protruding section of the spacer 30. The consequence is that the section of the glass sheet arrangement protruding out of the space between both the plates 1 and 2 is closed with both the glass sheets 31 and 32 by adhering to the protruding section of the spacer 30, whereas in the space between both the plates 1 and 2 the first glass sheet 31 is still at some distance from the spacer 30, because it is adhering to the second plate 2, because it is sucked to this. This state is shown in FIG. 4 with an exaggerated bending of the second plate 2 and the first glass sheet 31.

Thereafter, the fifth sealing device 9 is swiveled in its effective position, see FIG. 2 and FIG. 5. Now a chamber is formed between the plates 1 and 2, which is restricted on the down side by the horizontal conveyor 3 and by the fifth sealing device 9, on the sides by the plates 1 and 2 as well as by the first and the second sealing device 6, outside the device by the glass sheets 31 and 32 as well as by the spacer 30, and is open on the top. The chamber extends over the gap between both the sections 3*a* and 3*b* of the horizontal conveyor 3. In order that at this point, too, the chamber is sealed on the down side, a bridge 44 completing the sealing is provided between the two conveyor belts 22.

Into the chamber a gas other than air is introduced preferably from below e.g. in the way described in the EP 1 450 001 A1, especially a heavy gas, which rises in the chamber and thereby fills the space between the glass sheets 31 and 32. FIG. 2 shows that the level of the heavy gas 45 has reached the top of the glass sheets 31, 32. If an adequate quantity of the heavy gas is introduced, the supply of the heavy gas is stopped and the movable plate 2 is brought further closer to the fixed plate 1, while the pressurizing cylinder 42 is made non-pressurized, so that the deflection of the plate 2 and the bending of the first glass sheet 31 are cancelled. As a result, the first glass sheet 31 meets the spacer 30 with its remaining periphery and gets stuck to it. The movement of the second plate 2 against the first plate 1 ends, when the distance of both the plates 1 and 2 matches the specified reference thickness of the insulating glass pane.

Thereafter, the movable plate 2 is removed again from the fixed plate 1, the first sealing device 5 is drawn back in its ineffective position, the second sealing device 6 is drawn up in an ineffective position, the fifth sealing device 9 is swiveled down in its ineffective position and the assembled insulating glass pane is conveyed out from the device by driving forward the horizontal conveyor 3. During all this, another first glass sheet for the next insulating glass pane can be conveyed into the device.

Of course, the invention is not only suitable for triangular insulating glass panes, but also for insulating glass panes with any outline form, especially for rectangular insulating glass panes.

The third and the fourth sealing devices 7 and 8 remain in an ineffective position during the assembly and the gas-filling of over-long insulating glass panes. They are used when shorter insulating glass panes are assembled and filled with gas, whose length is less or much less that the distance of the first sealing device 5 to the second sealing device 6. To this extent, a reference is made to the disclosure in the German Patent Application 10 2005 033 040.1.

The embodiment shown in the FIGS. 6 and 7 is different from the one shown in FIGS. 1 to 5 by having a modified second sealing device 6 at the inlet-side edge of the device. It consists of a moderately thin spring steel strip 46 coated with a soft plastic, which is wound on a driven roller 47, which is placed on the plate 1 with an axis running at a right angle to the plane of the plate 1. A guide rail 48 or 49, respectively, with an L-shaped cross-section is placed at the upright, inlet-side edge of each the two plates 1 and 2. The guide rails 48 and 49 define a guiding slot 50 or 51, respectively, which are aligned to each other and take up the edges of the spring steel strip 46. The guiding slot 51 is deeper than the guiding slot 50, in order to have a clearance for the movement of the second plate 2. At the lower end of the spring steel strip 46 a series of densely packed bristles can be placed, with which it is possible to make the second sealing device 6 meet the edges of both the glass sheets 31 and 32 as well as the spacer 30. The functioning of this device is the same as of the device described in the context of the first embodiment.

LIST OF REFERENCE NUMBERS

1. first plate
1*a*. its inner side
2. second plate
3. horizontal conveyor
3*a*, 3*b* Sections of 3
4. direction of conveying
5. first sealing device
6. second sealing device
7. third sealing device
8. fourth sealing device
9. fifth sealing device
10. stand
11. Frame
12. Frame
13. Beam
14. Beam
15. Strut
16. Spindles
17. Bearing blocks
18. Bearing blocks
19. Rails
20. Casing with spindle nut
21. Casing with spindle nut
22. Conveyor belt
23. Roller
24. Strip
25. Sealing cord
26. Piston-cylinder unit
27. Sealing rod
28. Spring
29. Groove
30. Spacer
31. first glass sheet
32. second glass sheet
33. Strand
34. Spring strip
34*a*. Edge stripes
35. Rail
36. Carrier
37. Deflection device, roller
38. Lever
39. Axis
40. Pneumatic cylinder
41. Sealing element
42. Pressurizing cylinder

43. Piston rod
44. Bridge
45. Heavy gas level
46. Spring steel strips
47. Roller
48. Guiding rails
49. Guiding rails
50. Guiding slot
51. Guiding slot
52. Supporting beam

The invention claimed is:

1. Method for assembling insulating glass panes from two or more than two glass sheets, which are filled with a gas other than air, in a device having two plates facing each other, which are arranged parallel to each other vertically or inclined and their mutual distance can be changed, having a horizontal conveyor arranged near a lower edge of the plates along a lower length of the plates and having a conveying direction, having a first sealing device and a second sealing device, which are positioned at protruding edges of both the plates or near these edges or between the plates and can extend between the horizontal conveyor and a point lying above the horizontal conveyor, and having means for feeding a gas other than air into a chamber, which chamber is delimited by the two plates and by the two sealing devices, wherein for assembling overlong insulating glass panes, which are longer than the plates, the glass sheets, to one of which is attached a frame-like spacer, which spacer is provided with an adhesive on both of its sides, are positioned opposite to each other between the plates in such a way that the glass sheets lie with their one end between the plates and close to the first sealing device and protrude with their other end from a space between both the plates, that by the first sealing device the chamber is delimited upwardly from a location on the horizontal conveyor, that a first glass sheet, to which the spacer is not yet attached, is bonded to the spacer by bending and approaching to a second glass sheet a section of the first glass sheet protruding from the space between the two plates and is not bent in another section and the section of the first glass sheet not bent and lying at one of the two plates is kept at a distance from the spacer, and that thereafter from below or from a location close above the horizontal conveyor the gas other than air is introduced into the chamber, after which the insulating glass pane is closed completely and is pressed between the plates.

2. Method according to claim 1, wherein with the second sealing device the chamber is delimited coming from the top till an upper edge of the glass sheets.

3. Method according to claim 2, wherein the second sealing device, which is brought from a position above the spacer, is lowered till the spacer.

4. Method according to claim 1, wherein that the second plate is bent or deflected at its protruding edge in a direction to the opposite first plate, at which the second sealing device becomes effective.

5. Method according to claim 4, wherein in a device, in which the second plate is divided in at least two segments, the segment, at which the second sealing device becomes effective, is swiveled in a direction to the opposite first plate by an axis lying near a front side of the second plate, said axis being parallel to said second plate and at right-angle to the direction of conveying.

6. Method according to claim 1, wherein at each end of the device, at which the glass panes protrude from the device, the gap between the horizontal conveyor and a lower side piece of the spacer is completely sealed when the gas other than air is introduced.

* * * * *